DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 394

T913,009

PROCESS FOR ELECTROSTATIC DEPOSITION

Frederick D. Petke, 1333 Post St. 37664, and Peter M. Grant, Hemlock Park 37663, both of Kingsport, Tenn.

Filed Mar. 8, 1973, Ser. No. 339,235

Int. Cl. C09j *5/00*

U.S. Cl. 156—283

No Drawing. 4 Pages Specification

Disclosed is a process comprising electrostatically depositing on a fabric a powdered fusible adhesive which has a particle size in the range of 10 to 200 microns and is composed of (1) a copolyester of terephthalic acid, adipic acid, ethylene glycol, and 1,4-butanediol, or (2) an admixture of (1) and a vinyl polymer.